US010067976B2

(12) United States Patent
Paxton

(10) Patent No.: US 10,067,976 B2
(45) Date of Patent: Sep. 4, 2018

(54) METHOD FOR ENHANCING RECORD LINKAGE PRODUCTION DATA QUALITY

(71) Applicant: ADI, LLC, Rochester, NY (US)

(72) Inventor: K. Bradley Paxton, Webster, NY (US)

(73) Assignee: ADI, LLC, Rochester, NY (US)

( * ) Notice: Subject to any disclaimer, the term of this patent is extended or adjusted under 35 U.S.C. 154(b) by 632 days.

(21) Appl. No.: 14/659,978

(22) Filed: Mar. 17, 2015

(65) Prior Publication Data

US 2015/0269486 A1  Sep. 24, 2015

Related U.S. Application Data

(60) Provisional application No. 61/955,289, filed on Mar. 19, 2014.

(51) Int. Cl.
  *G06N 99/00* (2010.01)
  *G06F 17/30* (2006.01)

(52) U.S. Cl.
  CPC .. *G06F 17/30424* (2013.01); *G06F 17/30303* (2013.01); *G06N 99/00* (2013.01)

(58) Field of Classification Search
  CPC .............................. G06N 999/00; G06N 99/00
  See application file for complete search history.

(56) References Cited

U.S. PATENT DOCUMENTS 8,498,948 B2   7/2013   Huang

OTHER PUBLICATIONS

A. Elmagarmid et al., "Duplicate Record Detection: A Survey", IEEE Trans. on Know. and Data Eng., vol. 19, No. 1, Jan. 2007, 16 pages.*
Paxton: "Testing Record Linkage Production Data Quality" Slide Presentation at FedCASIC 2013, Washington, DC, Mar. 20, 2013.
Paxton: "Testing Record Linkage Production Data Quality" JSM Proceedings, Government Statistics Section Montreal, Canada: American Statistical Association. pp. 1157-1171, Aug. 8, 2013.
Paxton: "Using Record Linkage to Create Big Data? How Good Is It?" JSM Proceedings, Government Statistics Section; Washington, DC: American Statistical Association. pp. 742-754, Aug. 5, 2014.
Paxton: "Use of Synthetic Data in Testing Administrative Records Systems" Federal Committee on Statistical Methodology, 2012.
Paxton: "Testing Production Data Capture Quality" Federal Committee on Statistical Methodology, 2012.

* cited by examiner

*Primary Examiner* — Vincent Gonzales
(74) *Attorney, Agent, or Firm* — Brian B. Shaw, Esq.; Alfred Y. Chu, Esq.; Harter Secrest & Emery LLP

(57) ABSTRACT

A Record Linkage Production Data Quality (RLPDQ) tool provides an independent record linkage system producing comparative results with a production record linkage system and an efficient arbitration operation to resolve respective confusion matrices for the two systems. The tool can be used for enhancing the output of record linkage engines, for merging different files into a third file containing expanded descriptions of common entities in both files, and for making testable improvements to a record linkage engine.

41 Claims, 11 Drawing Sheets

|  |  | SUT Prediction | SUT Prediction | Row Sums |
|---|---|---|---|---|
|  |  | Positive Match | Negative Match |  |
| Data Truth | Positive Match | TP<br>cm | FN<br>M - cm | M |
| Data Truth | Negative Match | FP<br>m(1 - c) | TN<br>N - M - m(1 - c) | N - M |
| Column Sums |  | m | N - m | N |

FIG. 3

| | | Production RL System | | |
|---|---|---|---|---|
| | | SUT Prediction Positive Match | SUT Prediction Negative Match | Row Sums |
| Data Truth | Positive Match | $TP_P$ $\frac{\|m_P \cap m_I\| + \|\Delta_I\|}{c_P \|m_P\|}$ | $FN_P$ $\frac{\|\Delta_I\|}{M - c_P \|m_P\|}$ | M $\|m_P \cap m_I\| + \|\Delta_I\| + \|\Delta_P\|$ |
| Data Truth | Negative Match | $FP_P$ $\frac{\|m_P\| - \|m_P \cap m_I\| - \|\Delta_I\|}{\|m_P\|(1 - c_P)}$ | $TN_P$ $\frac{\|m_I\| - \|m_P \cap m_I\| - \|\Delta_I\|}{N - M - \|m_P\|(1 - c_P)}$ | N-M $\|m_P\| + \|m_I\| - 2\|m_P \cap m_I\| - \|\Delta_I\| - \|\Delta_P\|$ |
| Column Sums | | $\|m_P\|$ | $N - m_P$ $\|m_I\| - \|m_P \cap m_I\|$ | N $\|m_P\| + \|m_I\| - \|m_P \cap m_I\|$ |

FIG. 9

| | | Independent RL System | | |
|---|---|---|---|---|
| | | SUT Prediction Positive Match | SUT Prediction Negative Match | Row Sums |
| Data Truth | Positive Match | $TP_I$ $\frac{\|m_P \cap m_I\| + \|\Delta_P\|}{c_I \|m_I\|}$ | $FN_I$ $\frac{\|\Delta_I\|}{M - c_I \|m_I\|}$ | M $\|m_P \cap m_I\| + \|\Delta_I\| + \|\Delta_P\|$ |
| Data Truth | Negative Match | $FP_I$ $\frac{\|m_I\| - \|m_P \cap m_I\| - \|\Delta_P\|}{\|m_I\|(1 - c_I)}$ | $TN_I$ $\frac{\|m_P\| - \|m_P \cap m_I\| - \|\Delta_I\|}{N - M - \|m_I\|(1 - c_I)}$ | N-M $\|m_P\| + \|m_I\| - 2\|m_P \cap m_I\| - \|\Delta_I\| - \|\Delta_P\|$ |
| Column Sums | | $\|m_I\|$ | $N - m_I$ $\|m_P\| - \|m_P \cap m_I\|$ | N $\|m_P\| + \|m_I\| - \|m_P \cap m_I\|$ |

FIG. 10

| | | Production RL System ($E_1$) | | |
|---|---|---|---|---|
| | | SUT Prediction Positive Match | SUT Prediction Negative Match | Row Sums |
| Data Truth | Positive Match | $TP_P$<br>775+30=805 | $FN_P$<br>43 | M<br>848 |
| Data Truth | Negative Match | $FP_P$<br>808−775−30=3 | $TN_P$<br>925−775−43=107 | N−M<br>110 |
| Column Sums | | 808 | 150 | N<br>958 |

FIG. 14

| | | Independent RL System ($E_2$) | | |
|---|---|---|---|---|
| | | SUT Prediction Positive Match | SUT Prediction Negative Match | Row Sums |
| Data Truth | Positive Match | $TP_I$<br>775+43=818 | $FN_I$<br>30 | M<br>848 |
| Data Truth | Negative Match | $FP_I$<br>925−775−43=107 | $TN_I$<br>808−775−30=3 | N−M<br>110 |
| Column Sums | | 925 | 33 | N<br>958 |

FIG. 15

METHOD FOR ENHANCING RECORD LINKAGE PRODUCTION DATA QUALITY

TECHNICAL FIELD

The invention relates to the operation of record linkage engines involved with the construction of operatively defined "matching truth" data for interrelating data records from different sources for such purposes as data mining or data improvement. This matching is called "record linkage", but is also referred to as entity resolution, field matching, or data linkage.

BACKGROUND OF THE INVENTION

Record linkage is used to find common entities (e.g., persons, households, or businesses) between pairs of data records in disparate data files. Once these links are found, an improved data set can be obtained by merging the matched entity data. This resulting improved data set can then be used for the appropriate business purpose or further examined by "data mining". If, however, the record linkage is done poorly, the "improved" data set might actually be worse than before. Therefore, being able to test or verify record linkage systems is important to insure quality and to allow improvements.

Testing record linkage systems operating on large data sets ("big data") is difficult to do in practice, and is very difficult to do well, such as by producing quantitative metrics like false positive and false negative matches, as well as true positive and true negative matches.

Known methods for testing record linkage systems usually involve using ground-truth match data, if available. Ways to obtain such ground-truth match data include using data from a previous matching test, laboriously creating such data manually, or creating synthetic data.

SUMMARY OF THE INVENTION

The invention among certain of its embodiments envisions the use of two record-linkage engines, one deemed a production record linkage engine and the other deemed an independent engine. The two engines are necessarily different, using different algorithms, technology, or approaches to identify record linkages. Predicted positive matches can be collected from both engines, and the intersection of these predicted positive matches is a first level attempt at identifying the true positive matches. Already, at this point, an advantage is apparent, namely, the union, i.e., sum, of the separately predicted positive matches, which can be referred to as "entity matching space", contains a preponderance of the true matches. Another valuable result found at this point is that when matching two record files of approximately n records each, automation has been used to consolidate a "comparison space", i.e., the set of all possible comparisons which is of order $n^2$, to an "entity matching space", which is of order n, with no manual labor.

This smaller entity matching space can be further examined in a different fashion, e.g., semi-automatically or automatically, to find additional true positive matches, and thereby improve the precision by which the truth of the matches can be ascertained. These additional true positive matches correspond to false negative matches for one or the other of the independent engine and the production engine.

One version of the invention provides for enhancing the performance of a production record linkage engine. Under control of a processor configured with executable instructions, the production record linkage engine establishes first comparative links between individual records that empirically describe a person or thing in different electronically encoded files. The first comparative links include predicted positive matches between some of the individual records in the different files and predicted negative matches between other of the individual records in the different files. Second comparative links are established between the individual records of the different electronically encoded files with an independent record linkage engine under the control of a processor configured with different executable instructions from the executable instructions of the processor of the production record linkage engine. The second comparative links also include predicted positive matches between some of the individual records in the different files and predicted negative matches between other of the individual records in the different files. A processor configured with additional executable instructions identifies the predicted positive matches in common among the first and second comparative links as true positive matches. An arbitration is performed to identify additional true positive matches from among at least one of (a) the predicted positive matches of the first comparative links that correspond to predicted negative matches of the second comparative links and (b) the predicted positive matches of the second comparative links that correspond to predicted negative matches of the first comparative links. The first comparative links established by the production record linkage system are then revamped by at least one of (a) excluding from revamped predicted positive matches predicted positive matches of the first comparative links that are not among the true positive matches and (b) including within the revamped predicted positive matches predicted negative matches of the first comparative links that are among the true positive matches. The individual records in the different electronically encoded files include respective record addresses, and the revamped first comparative links include electronically encoded record links between the record addresses of the revamped predicted positive matches in the two different files.

Preferably, the addresses of the records in the different electronically encoded files are arranged in a record matrix within which individual elements of the record matrix are located by unique pairings of the record addresses from the different files and the individual elements hold information concerning record matching drawn from both the first and second comparative links established by the production and independent record linkage engines. The individual elements can hold information corresponding to the combination of a predicted positive or negative match from the first comparative links and a predicted positive or negative match from the second comparative links. The arbitration preferably adds additional information to individual elements holding information corresponding to a predicted positive match from either one of the first and second comparative links and a predicted negative match from the other of the first and second comparative links. The additional information is preferably sufficient to identify the individual elements subject to the arbitration as either a true positive match or a true negative match. Significant amounts of processing time can be saved by avoiding similar arbitration among the predicted negative matches of the first comparative links that correspond to predicted negative matches of the second comparative links. Thus, the arbitration can be limited to a portion of the entity matching space in which the record linkage engines disagree.

The executable instructions of a first of the production and independent record linkage engines preferably include at least one of (a) rules for making deterministic matches between the individual records in the different files and (b) algorithms for weighting multiple comparisons for making probabilistic matches between the individual records in the different files. The executable instructions of a second of the production and independent record linkage engines differ from the executable instructions of the first of the production and independent record linkage engines by including at least one of (a) unique rules for making deterministic matches between the individual records in the different files and (b) unique algorithms for weighting multiple comparisons for making probabilistic matches between the individual records in the different files.

Another version of the invention provides for using a compound record linkage system to merge individual records that empirically describe a person or thing from first and second electronically encoded files. First comparative links between the individual records of the first and second electronically encoded files are established with a first record linkage engine under the control of a processor configured with executable instructions. The first comparative links include predicted positive matches between some of the individual records in the first and second files and predicted negative matches between other of the individual records in the first and second files. Second comparative links between the individual records of the first and second electronically encoded files are established with a second record linkage engine under the control of a processor configured with different executable instructions from the executable instructions of the processor of the first record linkage engine. The second comparative links also include predicted positive matches between some of the individual records in the first and second files and predicted negative matches between other of the individual records in the first and second files. A processor configured with additional executable instructions identifies the predicted positive matches in common among the first and second comparative links as true positive matches. An arbitration is performed to identify additional true positive matches from among at least one of (a) the predicted positive matches of the first comparative links that correspond to predicted negative matches of the second comparative links and (b) the predicted positive matches of the second comparative links that correspond to predicted negative matches of the first comparative links. The first and second electronically encoded files are merged into a third electronically encoded file in which individual record pairings between the first and second files identified as true positive matches are combined as expanded empirical descriptions of common persons or things within individual records of the third electronically encoded file.

Preferably, the processor configured with additional executable instructions identifies the predicted positive matches in common among the first and second comparative links as a first set of true positive matches, and the arbitration identifies both a second set of true positive matches from among the predicted positive matches of the first comparative links that correspond to predicted negative matches of the second comparative links and a third set of true positive matches from among the predicted positive matches of the second comparative links that correspond to predicted negative matches of the first comparative links. The individual record pairings between the first and second files identified as being among the second and third sets of true positive matches are preferably combined as expanded empirical descriptions of common persons or things within individual records of the third electronically encoded file.

Yet another version of the invention provides for customizing a production record linkage engine. Under control of a processor configured with executable instructions for linking records between different electronically encoded files, the production record linkage engine establishes first comparative links between the individual records in the different files that include predicted positive matches between some of the individual records in the different files and predicted negative matches between other of the individual records in the different files. Second comparative links between the individual records of the different electronically encoded files are established with an independent record linkage engine under the control of a processor configured with different executable instructions from the executable instructions of the processor of the production record linkage engine. The second comparative links include predicted positive matches between some of the individual records in the different files and predicted negative matches between other of the individual records in the different files. A processor configured with additional executable instructions identifies the predicted positive matches in common among the first and second comparative links as true positive matches. An arbitration is performed to identify additional true positive matches from among at least one of (a) the predicted positive matches of the first comparative links that correspond to predicted negative matches of the second comparative links and (b) the predicted positive matches of the second comparative links that correspond to predicted negative matches of the first comparative links. The algorithm of the production record linkage engine is changed to at least one of (a) reduce the predicted positive matches of the first comparative links that are not among the true positive matches and (b) increase predicted positive matches of the first comparative links that are among the true positive matches.

BRIEF DESCRIPTION OF THE DRAWING FIGURES

FIG. 3 presents a confusion matrix for helping to understand the record linkage testing results for a system under test "SUT". The matrix contains four elements: True Positives TP, False Positives FP, False Negatives FN, and True Negatives TN. The total number of elements in the matrix is N; the number of positive matches predicted by the SUT is m; the number of true positive matches is M; and the precision is denoted by c.

Figure 4:
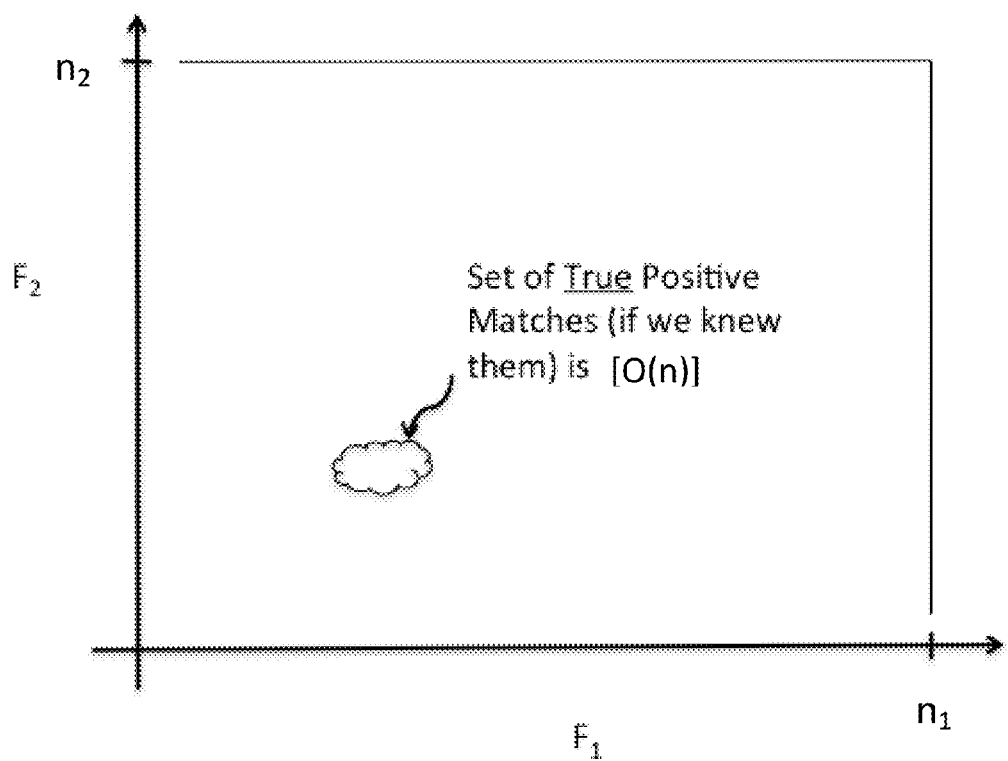

FIG. 4 is a graph of comparison space, containing $n_1 \times n_2$ pairs of entities, but showing the very small size of the set of true positive matches.

Figure 5:
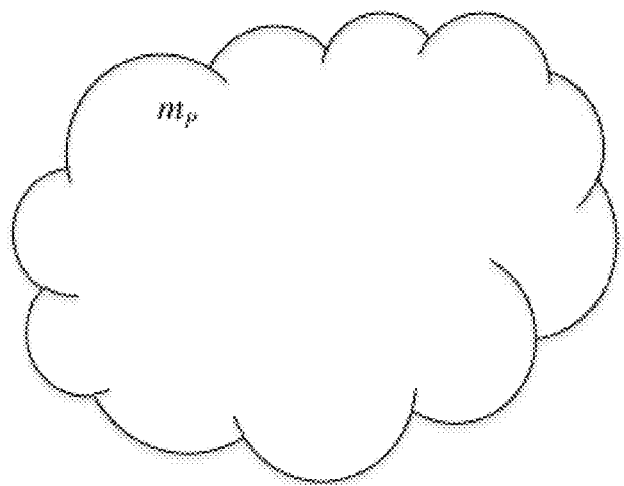

FIG. 5 is a conceptual graph of the set of positive matches predicted by the production record linkage system $m_P$.

Figure 6:
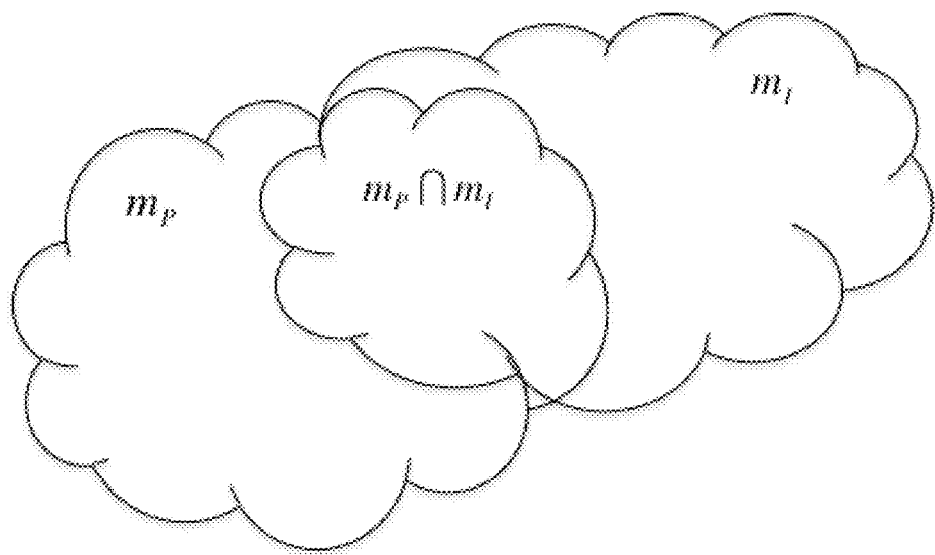

FIG. 6 adds to the conceptual graph of FIG. 5 the positive matches predicted by the independent record linkage engine $m_I$. The intersection of the two sets is a first estimation of true positive matches.

Figure 7:
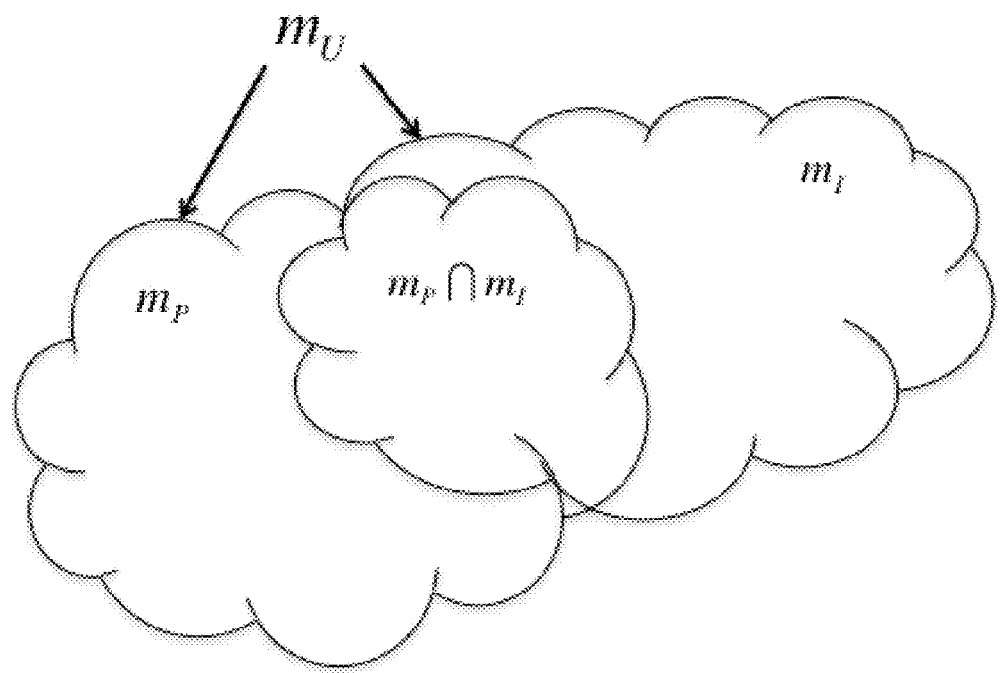

FIG. 7 shows the union of the two sets referred to as "entity matching space".

Figure 8:
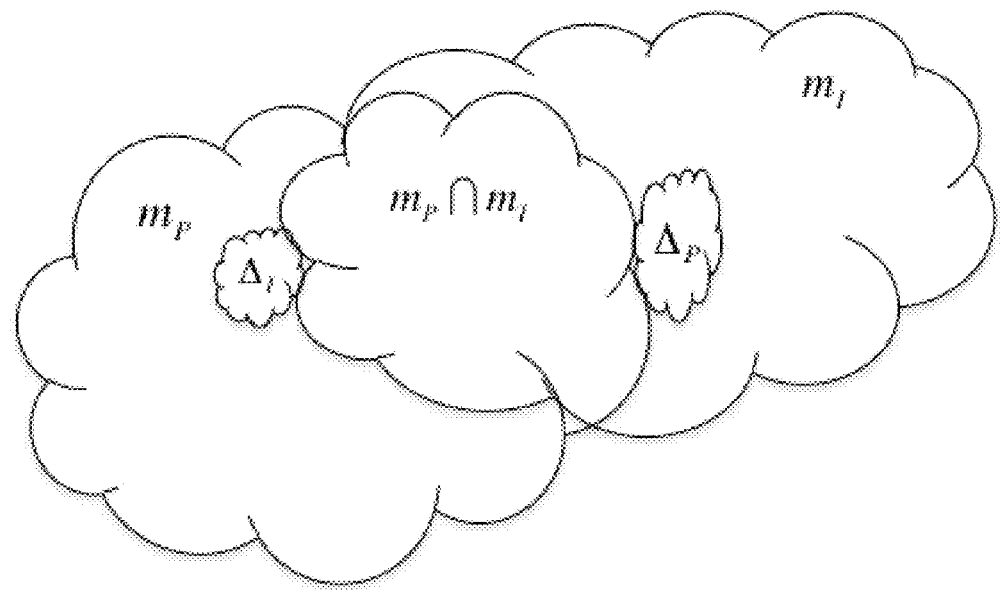

FIG. 8 adds to the conceptual graph of FIG. 7 two small additional sets that may be discovered to provide additional estimates of true positive matches within the entity matching space.

FIG. 9 presents a confusion matrix for the production RL system showing a division of entity matching space among True Positives TP, False Positives FP, False Negatives FN, and True Negatives TN referenced to the matches found by the production RL system.

FIG. 10 presents a confusion matrix for the independent RL system showing a division of entity matching space among True Positives TP, False Positives FP, False Negatives FN, and True Negatives TN referenced to the matches found by the independent RL system.

Figure 11:
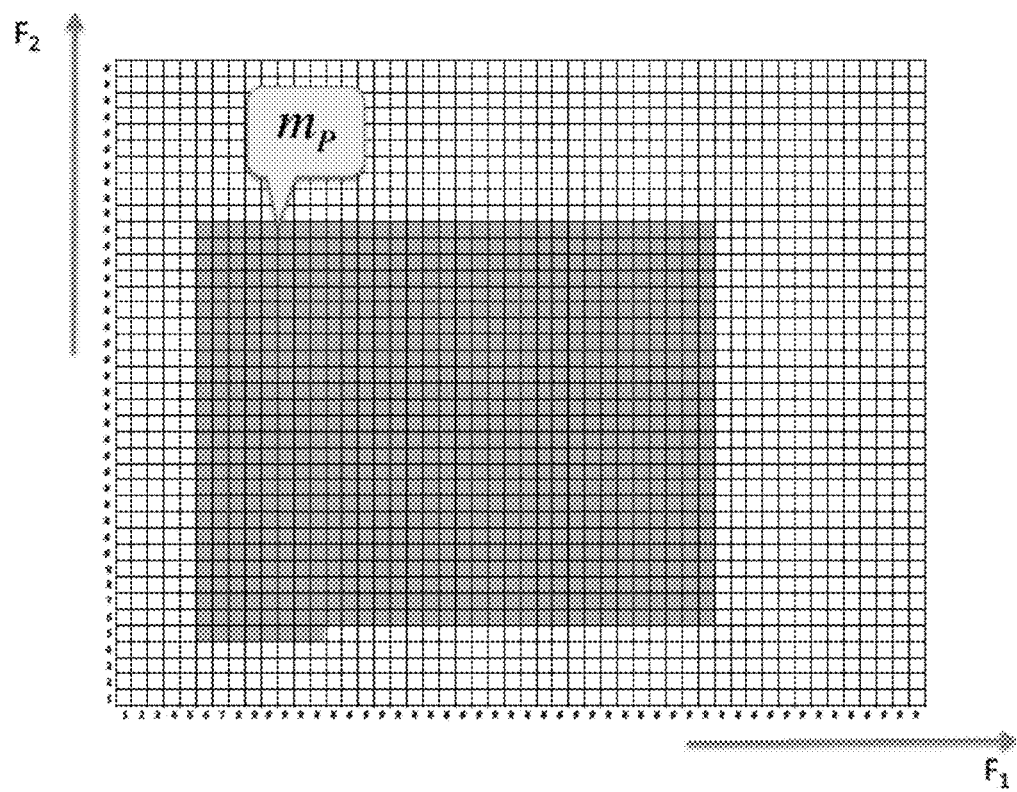

FIG. 11 is a graph of a small portion of comparison space to numerically identify positive matches of the production RL system ($E_1$) in an imposed cluster.

Figure 12:
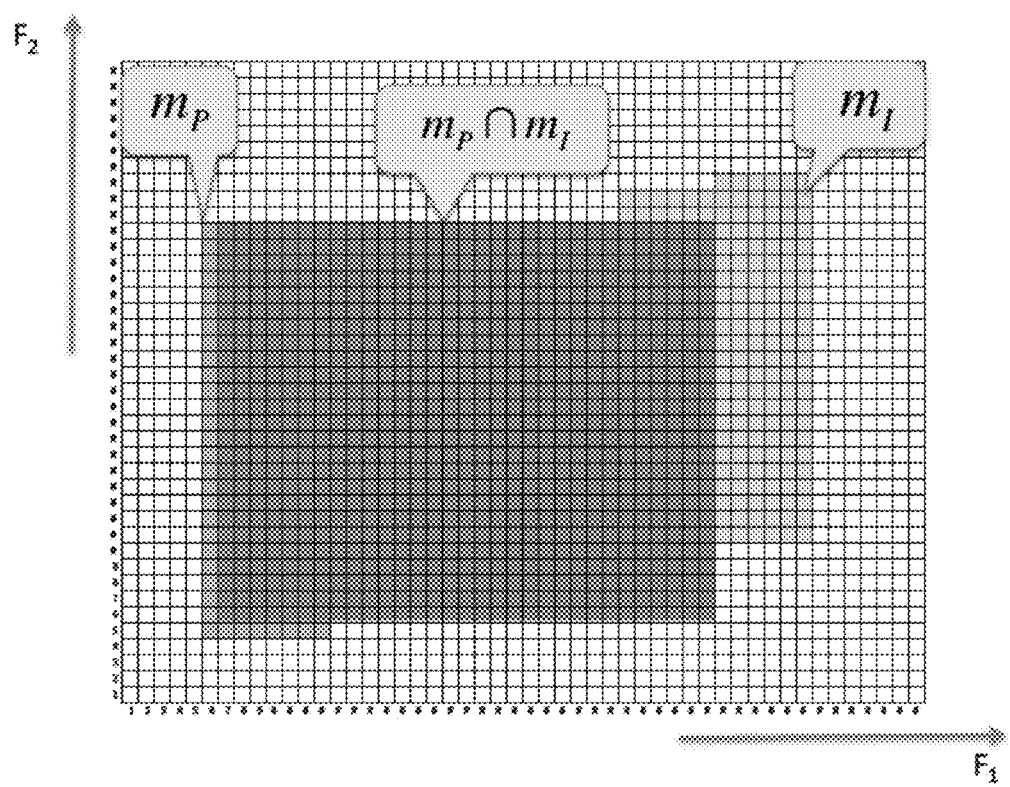

FIG. 12 appends to the graph of FIG. 11 positive matches of the independent RL system ($E_2$) in a partially overlapping cluster, with the region of overlap apparent from a darker shade of gray and the circumscribed outline of both regions comprising an entity matching space.

Figure 13:
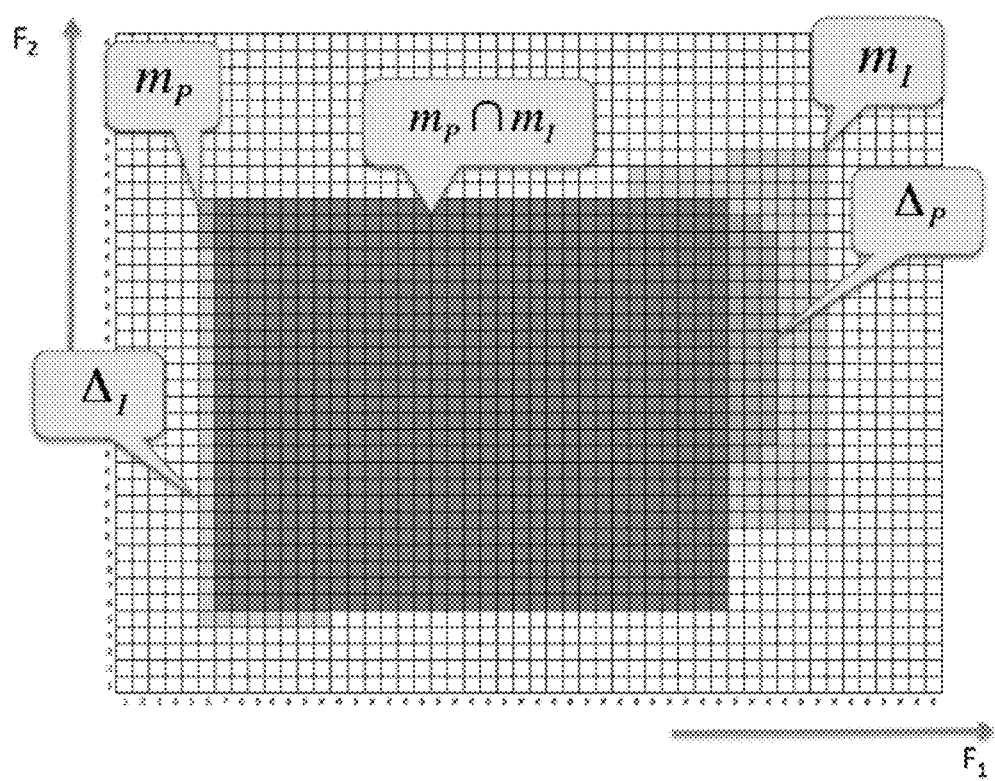

FIG. 13 appends to the graph of FIG. 12 the results of arbitration to provide additional estimates true positive matches within the entity matching space.

FIG. 14 fills the confusion matrix of FIG. 9 with numeric results for the exemplary production RL system ($E_1$) within the entity matching space examined by FIGS. 11-13.

FIG. 15 fills in the confusion matrix of FIG. 10 with numeric results for the exemplary independent RL system ($E_2$) within the entity matching space examined by FIGS. 11-13.

DETAILED DESCRIPTION OF THE INVENTION

Figure 1:
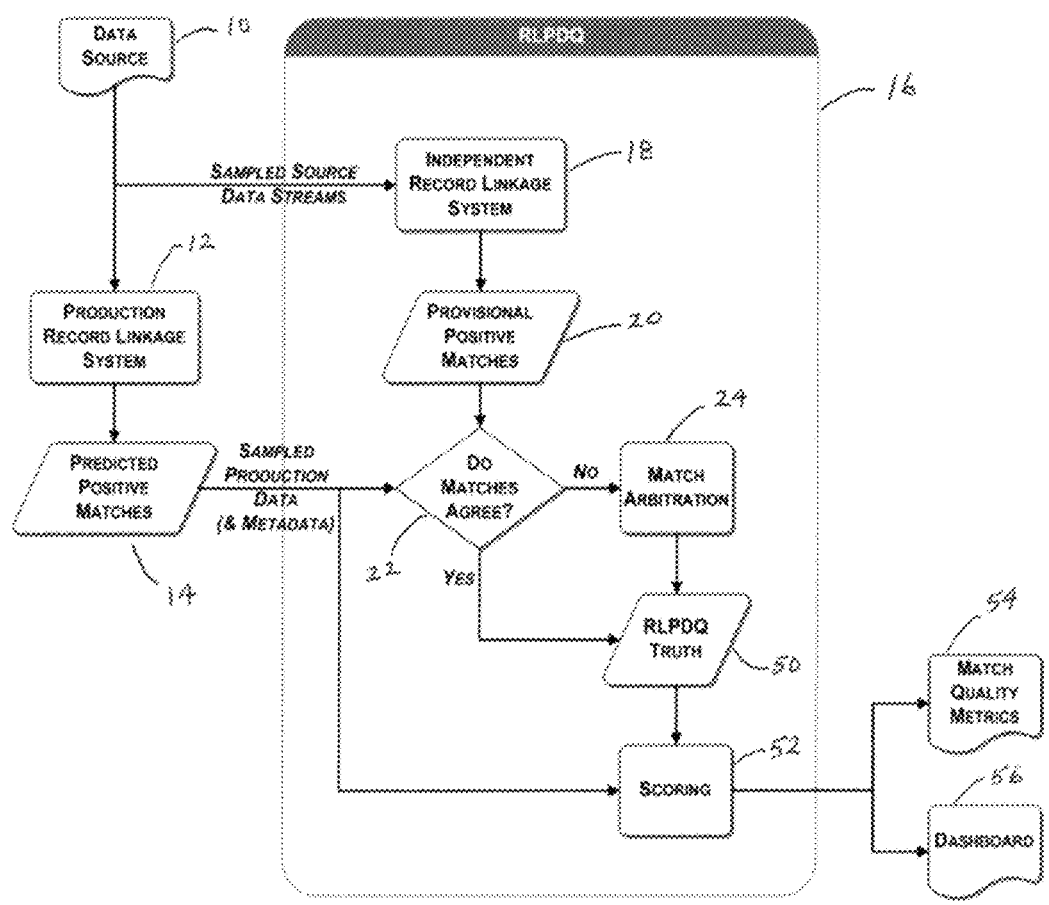
FIG. 1 is a flowchart depicting the integration of a Record Linkage Production Data Quality (RLPDQ) tool with the production record linkage system for evaluating the production record linkage matches.

In the block diagram in FIG. 1 featuring a Record Linkage Production Data Quality (RLPDQ) tool 16, a data source 10 is shown in the upper left-hand corner supplying data to a production record linkage (RL) system 12, and also sending the same data, possibly sampled, into an independent record linkage (RL) system 18. In order to achieve low measurement error, it is important to insure that the independent RL system 18 is fundamentally different from the production RL system 12. This may be accomplished by choosing a different technology, with different software code, or different matching criteria expressed within the code, or preferably both.

Both the production RL system 12 and the independent RL system 18 will then predict positive matches with a requisite degree of independence. These predicted positive matches 14 and 20 comprise both true positive TP matches and false positive FP matches. Matches not predicted to be positive by either system are therefore predicted to be negative by both systems; and the respective predicted negative matches are comprised of both true negative TN matches and false negative FN matches.

The independent RL system 18 is defined as independent relative to the production RL system 12 by its properties, techniques, weighting factors, methods, suppliers, or other characteristics that are different from the production system 12 under test. Typically, the production RL system 12 under test is either developed internally or provided by a commercial vendor. One approach to obtaining an independent RL system 18 is to use one of the readily available open-source systems available.

One such open-source RL system is FEBRL (Freely Extensible Biomedical Record Linkage), which has been developed since 2003 at the Australian National University to perform record linkage testing experiments. Others include BigMatch, developed by the U.S. Census Bureau, FRIL (Fine-Grained Records Integration and Linkage) developed by Emory University and the Centers for Disease Control (CDC), and many more.

One way to ensure the necessary independence between RL systems is to identify an independent RL system that uses a different scheme for performing the linkage. Since most RL systems are either deterministic or probabilistic in their approach, one can use that criteria and select an independent system that uses a deterministic approach if the production system uses a probabilistic approach, or vice-versa. Other criteria for selection of an independent system could be to use different vendors, different software written by different developers, or different weighting factors for various data elements.

However independence is achieved, sufficient relative independence will generally be found if the production and independent record linkage systems predict positive matches that differ significantly from each other. For example, independence is demonstrated by the production RL system predicting some positive matches not predicted by the independent RL system and the independent RL system predicting some positive matches not predicted by the production RL system. Different false positive and false negative matches can also be regarded as indicators of effective independence. By this type of assessment of independence, perfect independence is not required or even desirable. If two RL systems cannot agree on a single positive match, one or both RL systems are likely to be too inaccurate to be of practical use. In fact, a substantial amount of agreement, i.e., both RL systems predicting positive matches in common, is to be expected among high functioning RL systems.

Referring to the comparison made at decision step 22 of FIG. 1, most of the predicted positive matches between the two RL systems will likely agree because both systems are adept at performing record linkage. However, being different, the RL systems tend to make different mistakes. The matches that do not agree are subject to an arbitration operation 24 to seek additional positive matches. Both of these sets of positive matches can be arranged into a RLPDQ Truth file 50. Using the Truth file 50, a scoring operation 50 can be performed on the sampled production data along with the metadata associated with it. Quantitative quality metrics 54 can thereby be obtained including measures of: the true positives TP and false positives FP, as well as true negatives TN and false negatives FN. In addition, the results can be presented through a data quality dashboard 56 for easy viewing by management to monitor system performance in near real time during production.

Thus, by using an independent record linkage system that has different characteristics and/or settings from the production record linkage system, the combined results can be used to characterize both the resulting matched data and the systems themselves.

Figure 2:
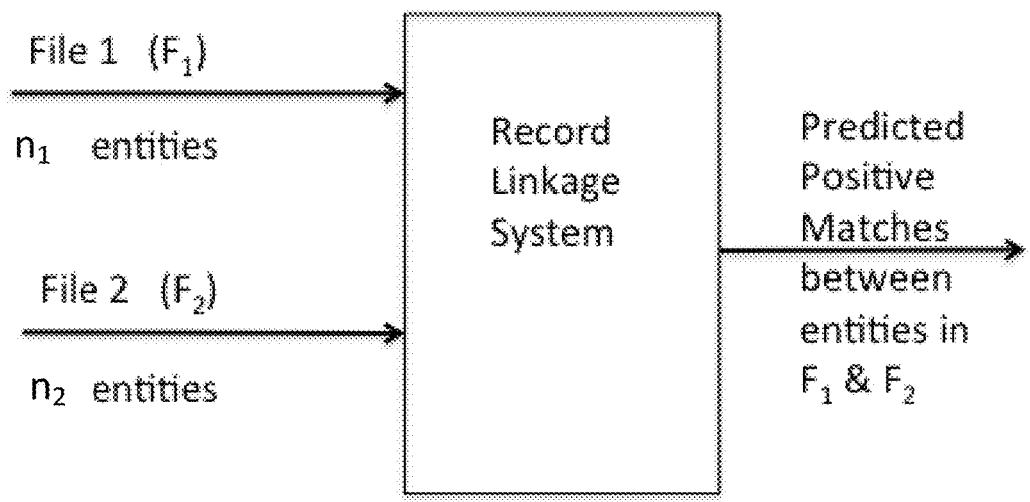
FIG. 2 is a simple block diagram of a typical record linkage system. Two files, $F_1$ and $F_2$, containing data about $n_1$ and $n_2$ entities respectively, are ingested by the record linkage system that attempts to identify positive matches between the entities.

A typical record linkage system would input two different electronically encoded files, $F_1$ and $F_2$, where the number of entity records in each file is $n_1$ and $n_2$, respectively. These files, $F_1$ and $F_2$, are input to the record linkage system (the system under test, or SUT), as shown in FIG. 2. A "record linkage system" in accordance with preferred embodiments of the invention includes an actual computing machine with appropriate software (generally referred to as an engine) that ingests two files $F_1$ and $F_2$, each consisting of many data records, electronically compares the two files $F_1$ and $F_2$ based on programmed criteria, and outputs predicted positive matches between individual records in the first file $F_1$ with individual records in the second file $F_2$. The record linkage engines themselves typically operate under the control of a processor configured with executable instructions. The individual records in the different electronically encoded files include respective record addresses, and the predictions preferably provide links between the positively matched record addresses in the two different files. Thus, the predictions provide comparative links between the two files, including predicted positive matches between some of the individual records in the two files and predicted negative matches between other of the individual records in the two files (either explicitly or by default as not being among the positively matched record pairings).

Such record linkage systems are commercially available from various sources including commercially available record linkage systems such as DataMatch Enterprise API from Data Ladder of Cambridge Mass., AutoMatch from Matchware Technologies, Inc. of Kennebunk, Me., and, WinPure Clean & Match from WinPure Ltd. of Reading, United Kingdom, among many others. Typically, the various algorithms by which these record linkage systems make comparisons are often proprietary, but the RLPDQ tool 16 can be used without specific knowledge of the interior workings of the RL systems under test.

The RLPDQ tool 16 also preferably operates under the control of a processor configured with executable instructions for processing initial results of the production and independent record linkage systems 12 and 18 including deciding at step 22 whether the predicted positive matches output from the production and independent systems agree. As such the predicted positive matches in common between the two systems 12 and 18 can be identified and arranged into the RLPDQ Truth file 50.

A typical record linkage test using "real" data, i.e., data that empirically describes a person or thing, is often conducted using two input files from credible sources; for example, a file of Census-type data and a file of Tax-type data. The record linkage system is run and a fraction of the total estimated possible positive matches is recorded, say, 90%. Then, a change is made to the record linkage system intended as a possible improvement, and now 93% matches are obtained. This may appear at first like a better outcome; however, if the additional predicted positive matches are false positives FP, the outcome is actually worse. It is very difficult to measure false positives FP in record linkage tests with "real" data or in production because the "Truth" is not known.

In general, the predicted positive matches from any SUT will contain both true positives TP and false positives FP. The rest are predicted negative matches, containing both true negatives TN and false negatives FN. FIG. 3 illustrates these possibilities in a "confusion matrix". The rows of the confusion matrix are the data truth for both positive and negative matches and the columns are predictions from the SUT for both positive and negative matches.

Results in all four boxes on the confusion matrix are needed to characterize the performance of a given record linkage system and to provide direction for making improvements. In the confusion matrix, the term usually defined as "precision" is denoted by c, the number of predicted positive matches is denoted by m, the number of actual positive matches is denoted by M, and the number of elements all total in the confusion matrix is N.

The correct matches are on the matrix main diagonal: i.e., true positives TP and true negatives TN. The incorrect matches are on the off diagonal: i.e., false negatives FN and false positives FP. Often, the false positives FP are called Type I errors, and the false negatives FN are called Type II errors. Which of these two types of errors is considered most problematic depends on the nature of the record linkage objectives and is usually related to the overall program "cost" of dealing with these errors.

The testing problem can be summarized as this: testing record linkage systems with real data is extremely difficult, and it is expensive to obtain quantitative metrics like false positives FP and false negatives FN. Further, if the record linkage has errors, then serious consequences are possible, for example, medical records, voter registration records, and use of administrative records in future Census applications. In production, the Record Linkage Production Data Quality (RLPDQ) tool 16 can bring automation to bear on testing when doing record linkage with real data. Many of the particular qualities useful for testing also have even more practical implications for enhancing record linkage performance, more reliably merging matching entity data, and providing customized improvements to the performance of production record linkage engines.

As apparent from FIG. 4, an initial challenge is to efficiently and cost-effectively consolidate data from a comparison space, i.e., the set of all possible comparisons of order $n^2$, to the neighborhood of the set of true positive matches TP that is of order n. For example, if the two files $F_1$ and $F_2$ have roughly 1,000 records each, the number of comparisons in comparison space the record linkage system has to perform to determine matches is about 1 million, whereas the number of final linked records will likely be around 1,000 or less.

A sequence of four set-theoretic diagrams is presented in FIGS. 5-8 to illustrate the data organization possible with the RLPDQ tool 16. These diagrams are drawn in a small portion of comparison space, in which each point corresponds to a record pair, consisting of data about one entity from file $F_1$ and another (but possibly the same) entity from file $F_2$. An "entity" can generally be almost any empirical data entry, but for purposes of this example, entities may be considered as people, or more specifically, heads of households. The record linkage system's task in this example is to examine all $n_1 \times n_2$ combinations of possible entity pairings between the two files $F_1$ and $F_2$ and to identify positive matches between them. We assume for purposes of analytical simplicity (it's a good idea in practice also) that duplicates have been removed from the two files $F_1$ and $F_2$ being linked.

In FIG. 5, we show a cloud representing the positive matches 14 predicted by the production RL system 12; this set of points in comparison space is labeled $m_P$. This is the production RL system's prediction of the correct matches. Although most of these matches are likely to be true positive TP matches, some may be false positives FP. In addition, some true positive TP matches may be outside of set $m_P$, and some of these may be captured by the independent RL system.

In FIG. 6 we append the predicted positive matches 20 from the independent RL system 18, which is labeled $m_I$. The intersection of these two sets is also shown in FIG. 6 and is labeled $m_P \cap m_I$. This intersection set $m_P \cap m_I$ represents the positive matches predicted by both the production RL system 12 and the independent RL system 18, and is a first estimate at true positive TP matching Truth, automatically, and without any human analyst effort. For purposes of further analysis, the intersection set $m_P \cap m_I$ is treated as containing TP matches.

Another important aspect of FIG. 6 is the union of the sets $m_P$ and $m_I$ given by: $m_P \cup m_I = m_P + m_I - m_P \cap m_I$. The union of the two sets $m_P \cup m_I$ is defined as "entity-matching space", which is expected to cover almost all of the true positive TP matches within the comparison space.

The only true positive TP matches that would not be found in entity-matching space are true positive TP matches not found by either the production RL system 12 or the independent RL system 18. Although such other true positive TP matches could exist, the number of these matches that would not be found by the RLPDQ tool 16 as described herein is expected to be very small compared to the number of matches within entity-matching space by $m_P \cup m_I$, assuming both the production and the independent RL systems are each production-quality and dissimilar.

In FIG. 7, a set $m_U$ represents the portion of entity-matching space outside the intersection set $m_P \cap m_I$ of the positive matches 14 and 20 predicted by both the production RL system 12 and the independent RL system 18. This set is defined as $m_U = m_P + m_I - 2m_P \cap m_I$ and represents a space productive for further exploration by an arbitration technique to seek additional positive matches whose truth is known beyond the confidence provided by either RL system alone.

This arbitration process, which is preferably performed as an arbitration operation 24 by the RLPDQ tool 16, can be a semi-automated process using human analysts who are presented with the two potentially matching entities for comparison in which one RL system 12 or 18 has deemed a match and the other RL system 18 or 12 has deemed not a match. In making the comparison, the analysts can be presented with other data associated with two entities found in the larger files from which the entities are drawn, and more than one analyst can be independently presented with the comparison information to determine whether the entities match to a higher level of confidence. One or more additional independent RL systems could be used to perform the arbitration within the $m_U$ set on a more automatic basis.

A major advantage of the RLPDQ tool 16 is that upwards of 90% of the true positive matches are expected to be found in the intersection $m_P \cap m_I$ that is completely determined by automation. Another advantage that can be exploited in arbitration is that one RL system or the other 12 or 18 is likely to predict a particular positive match correctly even if the two systems do not agree on that match. Thus, the $m_U$ set subject to arbitration identifies additional record pairings having a much higher likelihood of containing true positive matches than elsewhere in the comparison space.

In FIG. 8, a second estimate of true positive TP matches found through the arbitration process at step 24 in FIG. 1 is denoted by sets $\Delta_P$ and $\Delta_I$. These additional matches, as so arbitrated, represent true positive TP matches of one of the independent and production RL systems and false negative FN matches for the other of the independent and production RL systems within the $m_U$ space over which the two RL systems do not agree.

The sets $\Delta_P$ and $\Delta_I$ can provide information on the relative accuracies of the independent and production RL systems. The set $\Delta_P$ counts additional true positive TP matches among the positive match predictions of the independent RL system 18 and counts false negative FN matches among the negative match predictions of the production RL system 12. Similarly, the set $\Delta_I$ counts additional true positive TP matches among the positive match predictions of the production RL system 12 and counts false negative FN matches among the negative match predictions of the independent RL system 18. Subjecting the entire $m_U$ space to arbitration allows good assessments to be made of the respective precisions of the two RL systems 12 and 18 for predicting positive matches. For example, the precision $c_P$ of the production RL system 12 for predicting positive matches would equal the total confirmed positive matches $TP_P = m_P \cap m_I + \Delta_I$ divided by the number of positive matches predicted $m_P$, and the precision $c_I$ of the independent RL system 18 for predicting positive matches would equal the total confirmed positive matches $TP_I = m_P \cap m_I + \Delta_P$ divided by the number of positive matches predicted $m_I$. The additionally confirmed matches of the production and independent RL systems 12 and 18 within their respective portions of the $m_U$ space can be ascertained by arbitrating smaller regions of the $m_U$ space and applying interim precision ratios to predict the $\Delta_I$ and $\Delta_P$ sets over the entire $m_U$ space.

Based on the information gathered from both RL systems 12 and 18 and the arbitration applied to their respective areas of disagreement, a number of meaningful determinations can be made. For example, the number of true positive matches TP twice predicted by independent means within the entirety of comparison space is given by the equation $M = |m_P \cap m_I| + |\Delta_I| + |\Delta_P|$. In addition, confusion matrices can be established for the production and independent RL systems 12 and 18 to both characterize and compare the respective RL systems.

For the production RL system 12, the number of true positives is given as $TP_P = |m_P \cap m_I| + |\Delta_I|$; the number of false positives is given as $FP_P = |m_P| - |m_P \cap m_I| + |\Delta_I|$; the number of false negatives is given as $FN_P = |\Delta_P|$; and the number of true negatives is given as $TN_P = |m_I| - |m_P \cap m_I| - |\Delta_P|$. The total number of elements considered is $N = TP_P + FP_P + FN_P + TN_P$, which corresponds to the entity matching space $|m_P \cup m_I| = |m_P| + |m_I| - |m_P \cap m_I|$. The precision by which the production RL system 12 identifies true positive matches is given by: $c_P = TP_P / |m_P|$. This information allows the confusion matrix for the production RL system 12 to be established as shown in FIG. 9.

For the independent RL system 18, the number of true positives is given as $TP_I = |m_P \cap m_I| + |\Delta_P|$; the number of false positives is given as $FP_I = |m_I| - |m_P \cap m_I| - |\Delta_P|$; the number of false negatives is given as $FN_I = |\Delta_I|$; and the number of true negatives is given as $TN_I = |m_P| - |m_P \cap m_I| - |\Delta_I|$. The total number of elements considered is $N = TP_I + FP_I + FN_I + TN_I$, which remains the entity matching space $|m_P \cup m_I| = |m_P| + |m_I| - |m_P \cap m_I|$. The precision by which the independent RL system 18 identifies true positive matches is given by: $c_I = TP_I / |m_I|$. This information allows the confusion matrix for the independent RL system 18 to be established as shown in FIG. 10. The row sums for the confusion matrices of both the production and independent RL systems 12 and 18 remain the same because the total numbers of positive and negative matches remain the same as a basis for comparing the two RL systems within the same entity matching space $|m_P \cup m_I|$.

Given that the elements of the confusion matrices are known for the production and independent RL systems 12 and 18 further analysis is possible of either system according to other statistical methodologies, including methodologies set forth is a paper entitled *Testing Production Data Capture Quality* by K. Bradley Paxton. Steven P. Spiwak, Douglass Huang, and James K. McGarity, published in the Proceedings, Federal Committee on Statistical Methodology (FCSM), Washington, D.C., (2012). For example, a Receiver Operating Characteristic (ROC) analysis as outlined in this paper can be performed for the production RL system 12 by computing a True Positive Rate TPR as $TPR_P=TP_P/M$ and a False Positive Rate FPR as $FPR_P=FP_P/(N-M)$. In addition, an overall Accuracy ACC can be determined as $ACC_P=[M \times TPR_P+(N-M) \times (1-FPR_P)]/N$. The True Positive Rate TPR, the False Positive Rate FPR, and an overall Accuracy ACC can be similarly determined for the independent RL system 18.

Given that the testing has been done in the manner described previously, where complete confusion matrix data is now available for both RL engines, then examination of the errors, such as the false negatives for the production engine, can be used to discover potential problems in the linkage algorithm of production record linkage engine, which could then be remedied. For example, the production false negatives might include a preponderance of cases wherein the first and last names were interchanged, i.e., Smith John instead of John Smith, leading to a false negative because the production engine didn't think that was a positive match, when actually it was. The false positives could be similarly examined, and more problems uncovered and solved.

Additionally, given that the testing that was just accomplished involved two particular files, say Census file $F_1$ and Tax file $F_2$, then the total true positive matches uncovered by the testing could be delivered as a revamped output of the production RL engine instead of the production predicted positive matches otherwise output by the production RL engine. The output, for example, could be in the form of an electronic file that identifies pairings of record addresses in the two files $F_1$ and $F_2$ deemed as involving true positive matches between contents of the paired record addresses.

More specifically, and referring to FIG. 8, instead of shipping out the predicted positive matches from the production engine ($m_P$) as was originally intended, one could ship the total true positive matches, consisting of the sum of the intersection of the predicted positive matches in common between the production RL engine and the independent RL engine ($m_P \cap m_I$), the additional true positive matches among the predicted positive matches of the independent RL engine ($\Delta_P$), and the additional true positive matches among the predicted positive matches of the production RL engine ($\Delta_I$). The two-fold benefit here would be not only that better quality positive matches would be delivered than just the positive matches predicted by the production engine, but in addition, the efficiency of the delivered output would be greater because some new true positive matches would be shipped instead of false negatives. (False negatives affect efficiency because they are matches that escaped your production engine. For this reason, they are often referred to as "escapes".)

A Numerical Example

In a paper entitled *Use of Synthetic Data in Testing Administrative Records Systems* by K. Bradley Paxton and Thomas Hager, published in the Proceedings, Federal Committee on Statistical Methodology (FCSM), Washington, D.C., (2012, synthetic data was shown to be useful for testing a census-like administrative records system that performs record linkage with data from another agency to improve census data.

Using ADI LLC's Dynamic Data Generator™, two synthetic data sets of a little less than a thousand records each are created; the first set $F_1$ resembles census-type data and the second set $F_2$ resembles tax-type data. Using our terminology from above, the actual number of entities (heads of households) in each file are $n_1=985$ and $n_2=852$. Thus, the comparison space is given by $n_1 n_2 = 985 \times 852 = 839,220$.

Simulating different RL systems, two experimental record linkage systems are set up according to different criteria, a first RL system, $E_1$ using five comparison fields and a second RL system $E_2$ using four comparison fields. For purposes of further analysis, the RL System $E_1$ is equated to the production RL system 12 and the RL system $E_2$ is equated to the independent RL system 18.

FIG. 11 presents a graph plotting the predicted positive matches $m_P$ of the production RL system 12, previously determined to total 808 positive matches. The $m_P$ set of 808 positive matches is plotted in a first shade of gray within a small portion of comparison space involving 839,220 potential matches considered. The grid in FIG. 11 only spans 50×40=2,000 record pairs, which is over 400 times smaller than the entire comparison space. The consolidated adjacent locations of the positively matching record pairs in comparison space is arbitrary, as the entries in each of the rows and in each of the columns can interchanged to group the positive matches as desired.

FIG. 12 appends to the graph of FIG. 11 the predicted positive matches $|m_I|$ of the independent RL system 18 previously determined to total 925 positive matches. However, most of the 925 record matching pairs of the independent RL system 18 along with most of the record matching pairs of the production RL system 12 are hidden by the darker patch of gray representing a $|m_P \cap m_I|$ set of 775 record matching pairs in common with both the predicted positive matches $|m_P|$ of the production RL system 12 and the predicted positive matches $|m_I|$ of the independent RL system 18.

A proper RL system not only records how many positive matches are predicted, the system also records the particular record pairs that are positively matched. That is, the comparative links produced by the production and independent RL systems preferably include respectively predicted truth values for each possible record pairing between the considered files, where the record pairings themselves are identified by the respective addresses of the paired records from the different files. For example, the processor of the RLPDQ tool 16 preferably provides for arranging the addresses of the records in the two files in a record matrix within which individual elements of the record matrix are located by unique pairings of the record addresses from the different files and the individual elements hold predicted truth values established by the production and independent RL engines.

By sorting, then, it is possible to determine which positively matched record pairs are common to both the $|m_P|$ set of 808 matches found by the production RL system 12 ($E_1$) and the $|m_I|$ set of 925 matches found by the independent RL system 18 ($E_2$) and to plot a region of intersection defined by the set $|m_P \cap m_I|$. The positive matches predicted by both RL systems $|m_P \cap m_I|$ equals 775 estimated TP matches and appear in the darker shade of gray.

The entire entity matching space $|m_P \cup m_I|=|m_P|+|m_I|-|m_P \cap m_I|$ (808+925−775) consists of N=958 record matching pairs. The number of matching pairs within the entity matching space beyond the region of intersection, i.e., the $|m_P \cap m_I|$ set of 775 record matching pairs in common, consists of $|m_U|=|m_P|+|m_I|-2|m_P \cap m_I|(808+925-1550)=$ 183 record matching pairs. This limited number (i.e., 183) of record matching pairs in which the two RL systems 12 and 18 do not agree and is proposed for arbitration represents a very small fraction of the total comparison space, i.e., 183/839,220 or 0.022%.

Via a process of arbitration throughout the limited $|m_U|$ set, false negatives FN of the production RL system 12 $|\Delta_P|$ are found among the predicted matches of the independent RL system 18 and false negatives FN of the independent RL system 18 $|\Delta_I|$ are found among the predicted matches of the production RL system 12. The set $|\Delta_P|$ of 43 matching record pairs adds the estimated true positives $TP_I$ contributed by the independent RL system 18, and the set $|\Delta_I|$ of 30 matching record pairs adds the estimated true positives $TP_P$ contributed by the production RL system 12. The false negative FN sets $|\Delta_P|$ and $|\Delta_I|$ are shown in FIG. 13 in intermediate shades of gray. The process of arbitration adds additional information to individual elements of the record matrix sufficient to identify the individual elements subject to the arbitration as either a true positive match or a true negative match.

The confusion matrices for the production $E_1$ and independent $E_2$ RL systems 12 and 18 are presented in FIGS. 14 and 15. The precision $c_P=TP_P/|m_P|$ of the production RL system 12 is 805/808=0.996. The true positive rate $TPR_P=TP_P/M$ of the production RL system 12 is 805/848=0.949. The false positive rate $FPR_P=FP_P/(N-M)$ of the production RL system 12 is 3/110=0.027. The accuracy $ACC_P=(TP_P+TN_P)/N$ of the production RL system 12 is (805+107)/958=0.952

The precision $c_I=TP_I/|m_I|$ of the independent RL system 18 is 818/925=0.884. The true positive rate $TPR_I=TP_I/M$ of the independent RL system 18 is 818/848=0.965. The false positive rate $FPR_I=FP_I/(N-M)$ of the independent RL system 18 is 107/110=0.973. The accuracy $ACC_I=(TP_I+TN_I)/N$ of the independent RL system 18 is (818+3)/958=0.857. In terms of both precision c and accuracy ACC, the production RL system 12 ($E_1$) outperformed the independent RL system 18 ($E_2$) despite the fact that the independent RL system 18 ($E_2$) predicted more positive matches $m_I$. More false positive matches $FP_I$ were found among the predicted positive matches $m_I$ of the independent RL system 18 ($E_2$).

In addition to providing comparative data between the two RL systems 12 and 18, the RLPDQ tool 16 outlined above also provides improved results for accurately identifying the true positive matches TP within the comparison space. Assuming that the entire $|m_U|$ set is arbitrated, the RLPDQ tool 16 divides the entity matching space $|m_P \cup m_I|=|m_P|+|m_I|-|m_P \cap m_I|$ into true positive matches $TP=|m_P \cap m_I|+|\Delta_I|+|\Delta_P|=848$ and true negative matches $TN=|m_U|-|\Delta_I|-\Delta_P|=110$ in which two substantially independent comparisons systems agree with these results. The RLPDQ tool 16 confirmed more positive matches (848) than the positive matches (808) found by the more accurate of the two RL systems, while excluding the false positive matches (3) of the same more accurate system. Thus, using the RLPDQ tool 16 for record linkage provides less chance of missing true positive matches TP within the comparison space and also less chance of incorporating false positive matches FP among the returned results.

The testing performed in our above numerical example divided entity matching space into 848 true positive matches and 110 true negative matches with no false positives or false negatives (in this simple case). Delivering the 848 true positive matches as the revamped output of the production RL engine represents a significant improvement over the initial output of the production RL engine in which 808 predicted positive matches also contained 3 false positives and missed 43 "escapes" or false negatives.

Additionally, once testing has been completed on two files linked by two different record linkage engines as described above, additional benefits can be obtained by merging the now more correctly matched files into a third electronically encoded file that contains expanded empirical descriptions of the linked entities. For example, the third file can be created by operation of the revamped output of the production RL engine in which the identified record linkages provide an instruction set for generating the third file or by more directly merging the different data files into the third data file based on the improved record pairings created by the RLPDQ tool.

As an example of the tangible improvement to the merged data file, a John B. Smith household is found in a 2010 Census file with birthday mm/dd/yyyy as Dec. 31, 1948 and residence at 814 Lake Lane, Somewhere, N.Y. 14500. Also, in the same 2010 Census file there is his spouse, a Joya A. Smith, with birthday Oct. 16, 1949. Suppose now this Census household file was correctly linked, aided by the testing and improvements described herein, to a 2013 Social Security file, and the head of household and spouse both had sufficiently the similar names, birthdays and possibly other data for a correct link, but the address is now 955 Road Run, Somewhere, N.Y. 14500. In this case, if a third file is formed by merging the two linked files, then the third file would contain a better description of the residence locations of that particular Smith family over time, that is, the stored file would show that they resided at Lake Lane in 2010 but by 2013 were living at Road Run in the same town. The key to making this merging improvement possible is to achieve the correct link between the Census and Social Security files, for if the link is incorrectly made then the merged data file would be actually made worse.

The testing and separate assessments of the production and independent RL engines can also be used for making customized improvements to the production RL engine by reducing or otherwise balancing recognized sources of error. For example, the production RL engine predicted only 3 false positives but predicted 43 false negatives. Overall algorithmic changes could be made to the executable instructions of the production RL system to recognize more positive matches, such as lowering certain thresholds for finding a positive match. More targeted corrections could also be made by analyzing some or all of the 43 record pairings that the RLPDQ tool deemed to be false negatives. Specific changes could be made to the production RL algorithm to capture as predicted positive matches at least some of these 43 record pairings.

Valid test data, such as in the form of the referenced confusion matrices can be obtained by sampling data within the $m_U$ portion of entity-matching space outside the intersection set $m_P \cap m_I$. The sampled data can be used to estimate the overall sizes of the $\Delta_P$ and $\Delta_I$ sets based on ratios of the results obtained. Targeted changes can be made to the production RL algorithm to reduce either or both false positives $FP_P$ and false negatives $FN_P$ estimated from the sampled data. The production RL engine with the improved algorithm can be tested in a first instance using the same data files $F_1$ and $F_2$ and the previous arbitration results for resolving disagreements between the production and independent RL engines. To save time and cost, only disagreements between the engines that were not previously resolved are subject to new arbitration.

Those of skill in the art will appreciate that the subject invention can be embodied in these as well as other forms in accordance with the overall teaching of this invention.

The invention claimed is:

1. A method of enhancing the performance of a production record linkage engine under control of a processor configured with executable instructions for establishing first comparative links between individual records that empirically describe a person or thing in different electronically encoded files, the first comparative links including predicted positive matches between some of the individual records in the different files and predicted negative matches between other of the individual records in the different files, comprising steps of:

establishing second comparative links between the individual records of the different electronically encoded files with an independent record linkage engine under the control of a processor configured with different executable instructions from the executable instructions of the processor of the production record linkage engine, the second comparative links including predicted positive matches between some of the individual records in the different files and predicted negative matches between other of the individual records in the different files, using a processor configured with additional executable instructions to identify the predicted positive matches in common among the first and second comparative links as true positive matches, performing an arbitration to identify additional true positive matches from among at least one of:
(a) the predicted positive matches of the first comparative links that correspond to predicted negative matches of the second comparative links and
(b) the predicted positive matches of the second comparative links that correspond to predicted negative matches of the first comparative links, while substantially avoiding similar arbitration from among the predicted negative matches of the first comparative links that correspond to predicted negative matches of the second comparative links, and revamping the first comparative links established by the production record linkage system by at least one of:
(a) excluding from revamped predicted positive matches predicted positive matches of the first comparative links that are not among the true positive matches and
(b) including within the revamped predicted positive matches predicted negative matches of the first comparative links that are among the true positive matches, wherein the individual records in the different electronically encoded files include respective record addresses, and the revamped first comparative links include electronically encoded record links between the record addresses of the revamped predicted positive matches in the two different files.

2. The method of claim 1 in which the step of using a processor includes using the processor to identify the predicted positive matches in common among the first and second comparative links as a first set of true positive matches, and the step of performing an arbitration includes performing the arbitration (a) to identify a second set of true positive matches from among the predicted positive matches of the first comparative links that correspond to predicted negative matches of the second comparative links and (b) to identify a third set of true positive matches from among the predicted positive matches of the second comparative links that correspond to predicted negative matches of the first comparative links.

3. The method of claim 2 in which the step of revamping includes revamping the first comparative links established by the production record linkage system to:
(a) exclude from the revamped predicted positive matches predicted positive matches of the first comparative links that are not among the first and second sets of true positive matches, and
(b) include within the revamped predicted positive matches predicted negative matches of the first comparative links that are among the third set of true positive matches.

4. The method of claim 3 in which the revamped predicted positive matches include predicted positive matches of the first comparative links that are among the first and second sets of true positive matches.

5. The method of claim 2 in which the step of using a processor includes using the processor to identify the predicted negative matches in common among the first and second comparative links as a first set of true negative matches, and the step of performing an arbitration includes performing the arbitration (a) to identify a second set of true negative matches from among the predicted positive matches of the first comparative links that correspond to predicted negative matches of the second comparative links and (b) to identify a third set of true negative matches from among the predicted negative matches of the first comparative links that correspond to predicted positive matches of the second comparative links.

6. The method of claim 5 in which the step of excluding from revamped predicted positive matches corresponds to excluding from revamped predicted positive matches predicted positive matches of the first comparative links that are among the second set of true negative matches.

7. The method of claim 5 in which the step of including within the revamped predicted positive matches predicted negative matches of the first comparative links that are among the true positive matches, corresponds to including within the revamped predicted positive matches predicted positive matches of the second comparative links that are not among the among the third set of true negative matches.

8. The method of claim 1 in which the step of using the processor includes arranging the addresses of the records in the different electronically encoded files in a record matrix within which individual elements of the record matrix are located by unique pairings of the record addresses from the different files,
wherein the individual elements of the record matrix include information relating to record matching drawn from both the first and second comparative links established by the production and independent record linkage engines.

9. The method of claim 8 in which the individual elements hold information corresponding to the combination of a predicted positive or negative match from the first comparative links and a predicted positive or negative match from the second comparative links, and the step of performing an arbitration adds additional information to individual elements holding information corresponding to a predicted positive match from either one of the first and second comparative links and a predicted negative match from the other of the first and second comparative links in which the additional information is sufficient to identify the individual elements subject to the arbitration as either a true positive match or a true negative match.

10. The method of claim 1 in which at least one of the first and second comparative links established by the production and independent record linkage engines is stored in a non-transitory computer readable medium, and the processor configured with additional executable instructions is arranged to access the at least one of the first and second comparative links that is stored in a non-transitory computer readable medium.

11. The method of claim 10 in which the revamped first comparative links are stored in a non-transitory computer readable medium as an enhanced output of the production record linkage engine.

12. The method of claim 1 in which the executable instructions of a first of the production and independent record linkage engines include at least one of (a) rules for making deterministic matches between the individual records in the different files and (b) algorithms for weighting multiple comparisons for making probabilistic matches between the individual records in the different files.

13. The method of claim 12 in which the executable instructions of a second of the production and independent record linkage engines differ from the executable instructions of the first of the production and independent record linkage engines by including at least one of (a) unique rules for making deterministic matches between the individual records in the different files and (b) unique algorithms for weighting multiple comparisons for making probabilistic matches between the individual records in the different files.

14. The method of claim 1 in which the executable instructions of the production record linkage engine include rules for making deterministic matches between the individual records in the different files, the executable instructions of the independent record linkage engine include algorithms for weighting multiple comparisons for making probabilistic matches between the individual records in the different files, and the step of performing an arbitration is primarily directed to identifying additional true positive matches from among the predicted positive matches of the second comparative links that correspond to predicted negative matches of the first comparative links.

15. The method of claim 1 in which the step of performing an arbitration substantially avoids a similar arbitration among the predicted negative matches of the first comparative links that correspond to predicted negative matches of the second comparative links.

16. The method of claim 1 in which the step of performing an arbitration is at least partially automated.

17. The method of claim 16 in which the step of performing an arbitration includes establishing third comparative links between subsets of the individual records of the different electronically encoded files with an arbitration record linkage engine under the control of a processor configured with executable instructions that differ from the executable instructions of the production and independent record linkage systems.

18. The method of claim 1 in which at least one of the different files includes individual records comprising at least one of census data, tax payer data, and patient medical data.

19. The method of claim 1 in which the different electronically encoded files include first and second electronically encoded files, and including a further step of generating a third electronically encoded file by appending to the individual records of the first electronically encoded file matching individual records from the second electronically coded file using the revamped first comparative links.

20. A method of using a compound record linkage system to merge individual records that empirically describe a person or thing from first and second electronically encoded files, comprising steps of:
   establishing first comparative links between the individual records of the first and second electronically encoded files with a first record linkage engine under the control of a processor configured with executable instructions, the first comparative links including predicted positive matches between some of the individual records in the first and second files and predicted negative matches between other of the individual records in the first and second files,
   establishing second comparative links between the individual records of the first and second electronically encoded files with a second record linkage engine under the control of a processor configured with different executable instructions from the executable instructions of the processor of the first record linkage engine, the second comparative links including predicted positive matches between some of the individual records in the first and second files and predicted negative matches between other of the individual records in the first and second files,
   using a processor configured with additional executable instructions for identifying the predicted positive matches in common among the first and second comparative links as true positive matches,
   performing an arbitration to identify additional true positive matches from among at least one of:
     (a) the predicted positive matches of the first comparative links that correspond to predicted negative matches of the second comparative links and
     (b) the predicted positive matches of the second comparative links that correspond to predicted negative matches of the first comparative links, and
   merging the first and second electronically encoded files into a third electronically encoded file in which individual record pairings between the first and second files identified as true positive matches are combined as expanded empirical descriptions of common persons or things within individual records of the third electronically encoded file.

21. The method of claim 20 in which the individual records in the first and second electronically encoded files include respective record addresses, and the true positive matches are associated with electronically encoded record links between the record addresses in the first and second files.

22. The method of claim 20 in which the combined records in the third electronically encoded file include record pairings between the first and second electronically encoded files that include predicted positive matches of the first comparative links and predicted negative matches of the second comparative links.

23. The method of claim 20 in which the step of using a processor includes using the processor to identify the predicted positive matches in common among the first and second comparative links as a first set of true positive matches, and the step of performing an arbitration includes performing the arbitration (a) to identify a second set of true positive matches from among the predicted positive matches of the first comparative links that correspond to predicted negative matches of the second comparative links and (b) to identify a third set of true positive matches from among the predicted positive matches of the second comparative links that correspond to predicted negative matches of the first comparative links.

24. The method of claim 23 in which the individual record pairings between the first and second files identified as being among the second and third sets of true positive matches are combined as expanded empirical descriptions of common persons or things within individual records of the third electronically encoded file.

25. The method of claim 20 in which the step of using a processor includes identifying the predicted negative matches in common among the first and second comparative links as true negative matches, and in which the step of performing an arbitration includes performing the arbitration (a) to identify a second set of true negative matches from among the predicted positive matches of the first comparative links that correspond to predicted negative matches of the second comparative links and (b) to identify a third set of true negative matches from among the predicted negative matches of the first comparative links that correspond to predicted positive matches of the second comparative links.

26. The method of claim 25 in which in which individual record pairings between the first and second files identified as being among the second and third sets of true negative matches are excluded from being combined as expanded empirical descriptions of common persons or things within individual records of the third electronically encoded file.

27. The method of claim 20 in which the first and second comparative links established by the first and second record linkage engines are stored in a non-transitory computer readable medium, and the processor configured with additional executable instructions is arranged to access the first and second comparative links that are stored in a non-transitory computer readable medium.

28. The method of claim 20 in which the executable instructions of the first record linkage engine differ from the executable instructions of the second record linkage engine by including at least one of (a) unique rules for making deterministic matches between the individual records in the different files and (b) unique algorithms for weighting multiple comparisons for making probabilistic matches between the individual records in the different files.

29. The method of claim 20 in which the executable instructions of the first record linkage engine include rules for making deterministic matches between the individual records in the different files, and the executable instructions of the second record linkage engine include algorithms for weighting multiple comparisons for making probabilistic matches between the individual records in the different files.

30. The method of claim 29 in which the step of performing an arbitration is primarily directed to identifying additional true positive matches from among the predicted positive matches of the second comparative links that correspond to predicted negative matches of the first comparative links.

31. The method of claim 20 in which the step of performing an arbitration substantially avoids a similar arbitration among the predicted negative matches of the first comparative links that correspond to predicted negative matches of the second comparative links.

32. The method of claim 20 in which the step of performing an arbitration includes establishing third comparative links between subsets of the individual records of the different electronically encoded files with an arbitration record linkage engine under the control of a processor configured with executable instructions that differ from the executable instructions of the production and independent record linkage systems.

33. The method of claim 20 in which at least one of the different files includes individual records comprising at least one of census data, tax payer data, and patient medical data.

34. A method of customizing a production record linkage engine under control of a processor configured with executable instructions for linking records between different electronically encoded files in which the production record linkage engine establishes first comparative links between the individual records in the different files that include predicted positive matches between some of the individual records in the different files and predicted negative matches between other of the individual records in the different files, comprising steps of:

establishing second comparative links between the individual records of the different electronically encoded files with an independent record linkage engine under the control of a processor configured with different executable instructions from the executable instructions of the processor of the production record linkage engine, the second comparative links including predicted positive matches between some of the individual records in the different files and predicted negative matches between other of the individual records in the different files, using a processor configured with additional executable instructions for identifying the predicted positive matches in common among the first and second comparative links as true positive matches, performing an arbitration to identify additional true positive matches from among at least one of:
   (a) the predicted positive matches of the first comparative links that correspond to predicted negative matches of the second comparative links and
   (b) the predicted positive matches of the second comparative links that correspond to predicted negative matches of the first comparative links, and changing the algorithm of the production record linkage engine to at least one of:
   (a) reduce the predicted positive matches of the first comparative links that are not among the true positive matches and
   (b) increase predicted positive matches of the first comparative links that are among the true positive matches.

35. The method of claim 34 in which the step of performing the arbitration includes identifying true negative matches from among the predicted positive matches of one of the first and second comparative links that correspond to predicted negative matches of the other of the first and second comparative links, and in which the step of changing the algorithm of the production record linkage engine includes changing the algorithm of the production record linkage engine to at least one of increase the predicted negative matches of the first comparative links that are among the true negative matches and decrease the predicted negative matches of the first comparative links that are not among the true negative matches.

36. The method of claim 34 in which the executable instructions of a first of the production and independent record linkage engines include at least one of (a) rules for making deterministic matches between the individual records in the different files and (b) algorithms for weighting multiple comparisons for making probabilistic matches between the individual records in the different files, and in which the executable instructions of a second of the production and independent record linkage engines differ from the executable instructions of the first of the production and independent record linkage engines by including at least one of (a) unique rules for making deterministic matches between the individual records in the different files and (b) unique algorithms for weighting multiple comparisons for making probabilistic matches between the individual records in the different files.

37. The method of claim 34 in which the executable instructions of the production record linkage engine include rules for making deterministic matches between the individual records in the different files, the executable instructions of the independent record linkage engine include algorithms for weighting multiple comparisons for making probabilistic matches between the individual records in the different files, and the step of performing an arbitration is primarily directed to identifying additional true positive matches from among the predicted positive matches of the second comparative links that correspond to predicted negative matches of the first comparative links.

38. The method of claim 37 in which the step of changing the algorithm of the production record linkage engine includes changing the algorithm of the production record linkage engine to increase predicted positive matches of the first comparative links that are among the true positive matches.

39. The method of claim 37 in which the step of changing the algorithm of the production record linkage engine includes increasing the deterministic matches between the individual records in the different files.

40. The method of claim 34 in which the step of performing an arbitration substantially avoids a similar arbitration among the predicted negative matches of the first comparative links that correspond to predicted negative matches of the second comparative links.

41. The method of claim 34 in which the step of performing an arbitration includes establishing third comparative links between subsets of the individual records of the different electronically encoded files with an arbitration record linkage engine under the control of a processor configured with executable instructions that differ from the executable instructions of the production and independent record linkage systems.

* * * * *